United States Patent
Taki et al.

(10) Patent No.: US 8,089,868 B2
(45) Date of Patent: Jan. 3, 2012

(54) WIRELESS COMMUNICATION APPARATUS AND WIRELESS COMMUNICATION METHOD USING VARIABLE TRANSMISSION RATE

(75) Inventors: Daisuke Taki, Yokohama (JP); Masahiro Sekiya, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 596 days.

(21) Appl. No.: 12/240,283

(22) Filed: Sep. 29, 2008

(65) Prior Publication Data

US 2009/0092110 A1  Apr. 9, 2009

(30) Foreign Application Priority Data

Oct. 5, 2007  (JP) ................................. 2007-262622

(51) Int. Cl.
  *H04L 12/26* (2006.01)
(52) U.S. Cl. ....................................... 370/229; 370/474
(58) Field of Classification Search .................. 370/229, 370/310, 338, 470, 474, 471, 252, 235, 236
  See application file for complete search history.

(56) References Cited

U.S. PATENT DOCUMENTS

| 7,724,726 B2* | 5/2010 | Lee et al. ....................... 370/349 |
| 2003/0103460 A1* | 6/2003 | Kamath et al. ............. 370/236.2 |
| 2004/0228285 A1* | 11/2004 | Moon et al. .................... 370/252 |
| 2006/0104300 A1* | 5/2006 | Ho ................................. 370/428 |
| 2007/0280130 A1 | 12/2007 | Matsuo |
| 2007/0280181 A1 | 12/2007 | Matsuo et al. |
| 2010/0037124 A1* | 2/2010 | Hoshi et al. ................... 714/799 |

FOREIGN PATENT DOCUMENTS

JP  2006-352844  12/2006

* cited by examiner

*Primary Examiner* — Gary Mui
(74) *Attorney, Agent, or Firm* — Oblon, Spivak, McClelland, Maier & Neustadt, L.L.P.

(57) ABSTRACT

A wireless communication apparatus includes a transmission section and a control section. The transmission section transmits data using wireless communication. The control section controls a transmission rate for the transmission section. The control section limits data size of data to be transmitted to at most a prescribed value and requests a transmission acknowledgement, during a period from immediately after a change in the transmission rate until number of times that the transmission section transmits data reaches a prescribed number of times.

20 Claims, 12 Drawing Sheets

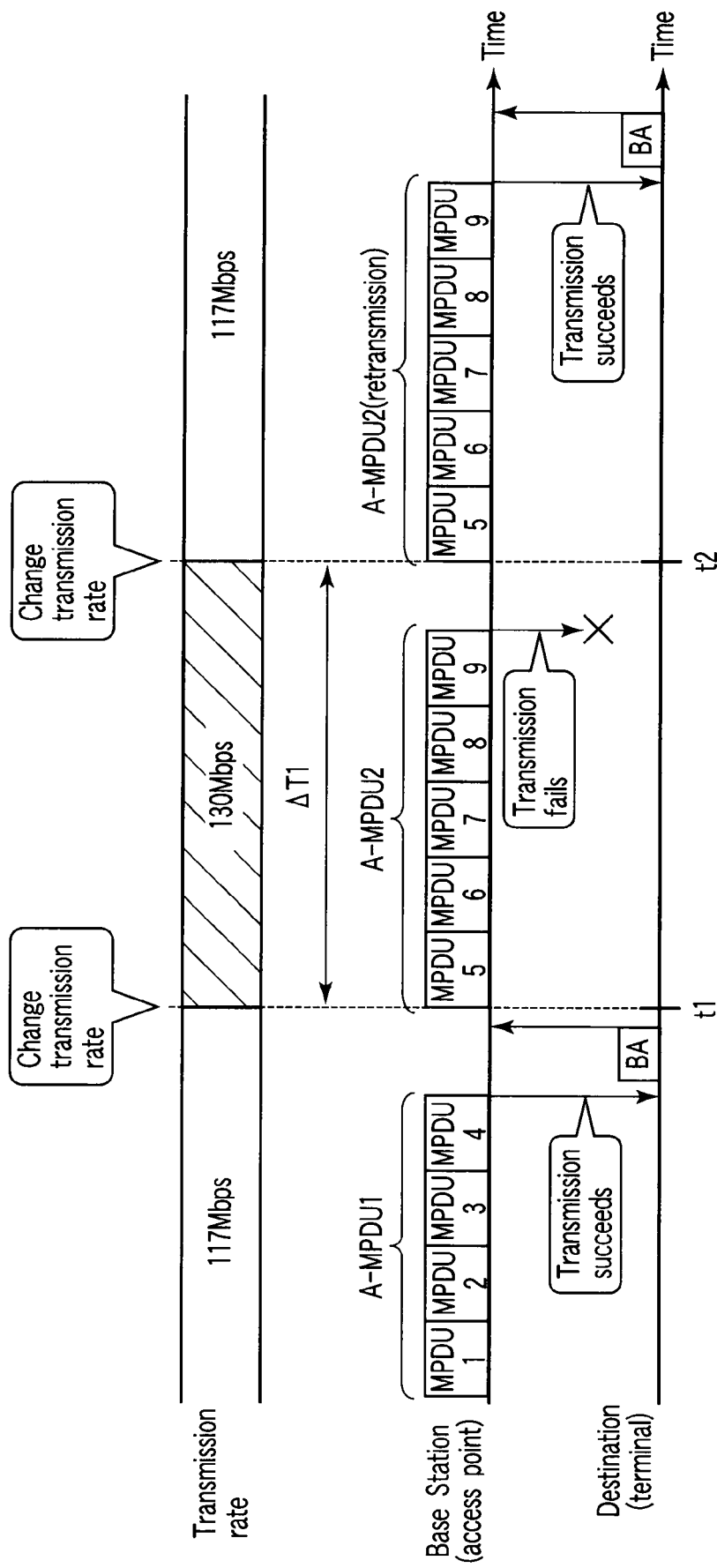
F I G. 7

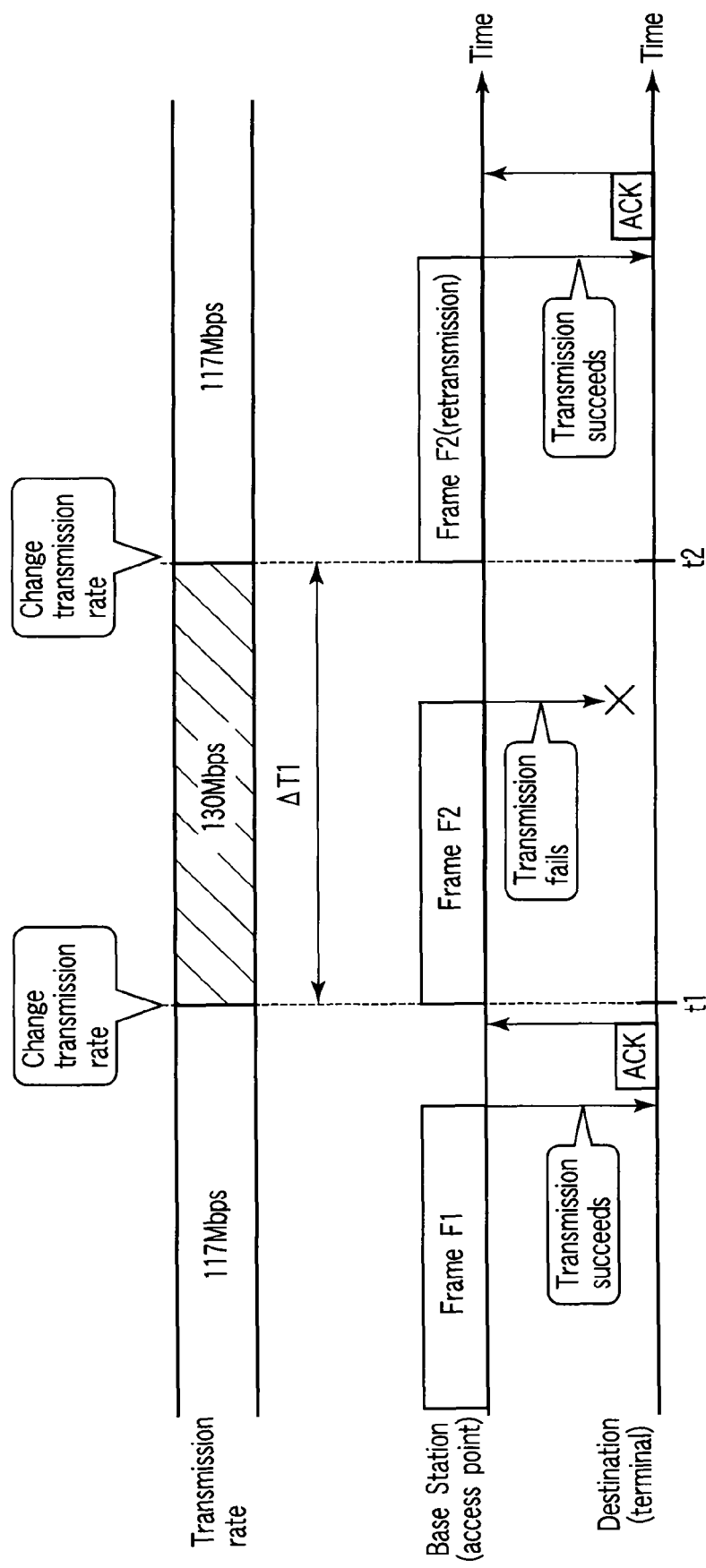
F I G. 12

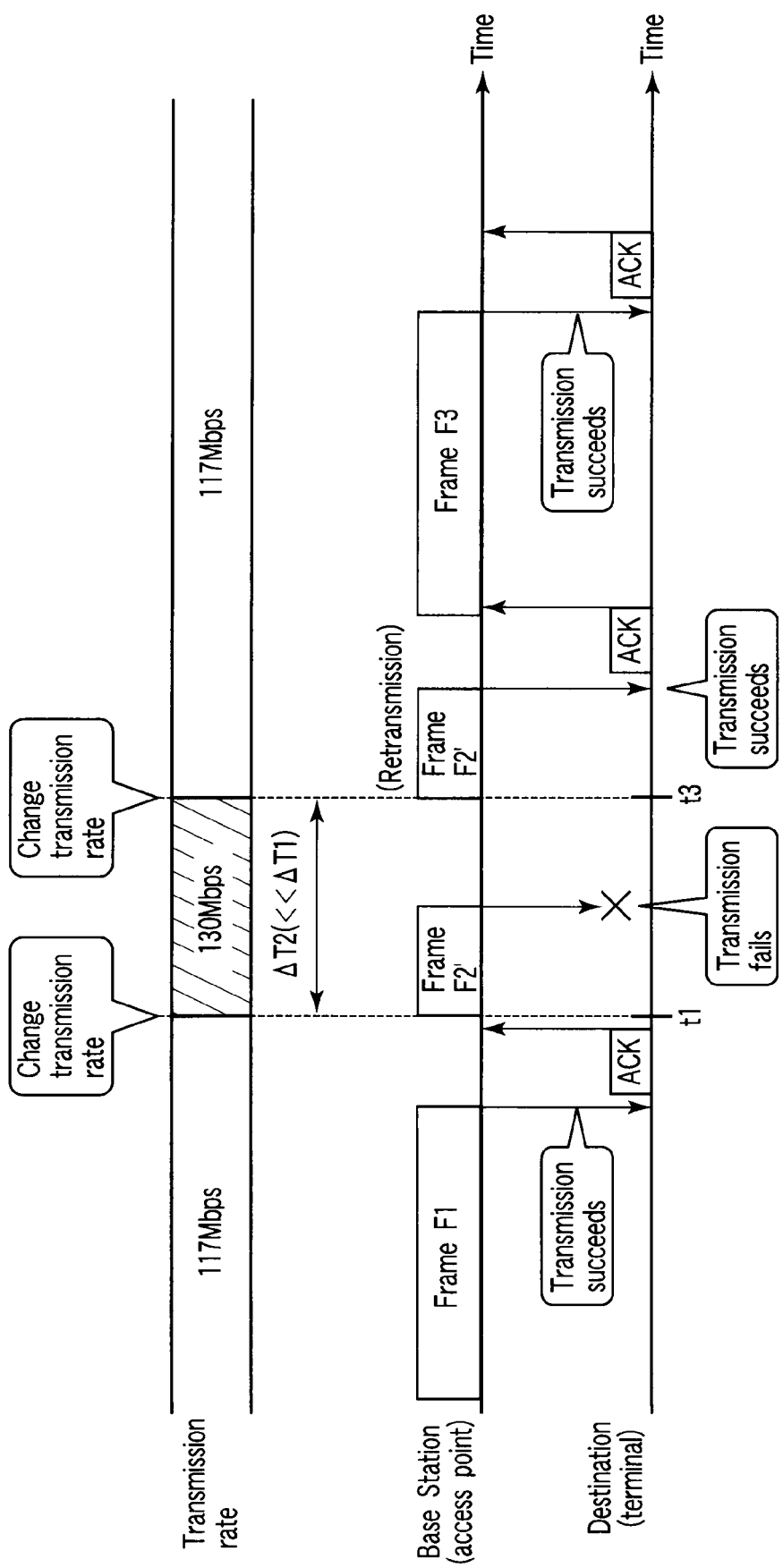
F I G. 13

WIRELESS COMMUNICATION APPARATUS AND WIRELESS COMMUNICATION METHOD USING VARIABLE TRANSMISSION RATE

CROSS-REFERENCE TO RELATED APPLICATIONS

This application is based upon and claims the benefit of priority from prior Japanese Patent Application No. 2007-262622, filed Oct. 5, 2007, the entire contents of which are incorporated herein by reference.

BACKGROUND OF THE INVENTION

1. Field of the Invention

The present invention relates to a wireless communication apparatus and a wireless communication method using a variable transmission rate, and for example, to a wireless communication apparatus that aggregates a plurality of frames for transmission.

2. Description of the Related Art

The Institute of Electrical and Electronics Engineers (IEEE) 802.11 Committee is now formulating IEEE 802.11n standards that are next-generation high-speed wireless local area network (LAN) standards.

The IEEE 802.11n standards adopt Aggregate-MPDU (A-MPDU) that allows a plurality of MAC protocol data units (MPDUs) to be transmitted as a single PHY protocol data unit (PPDU). Bringing a plurality of MPDUs together into a single PPDU is called aggregation. In the specification, if MPDU and A-MPDU are not distinguished from each other, these units are simply called frames. The use of A-MPDU is expected to enable transfer that is more efficient than short inter-frame space (SIFS) burst transfer, which is most efficient in all the conventional standards including the latest IEEE 802.11e standards. Such a technique is disclosed in, for example, Jpn. Pat. Appln. KOKAI Publication No. 2006-352844.

However, frame transmission efficiency generally decreases with increasing frame length. If the transmission efficiency decreases to prevent accurate transmission, the same frame needs to be transmitted again (hereinafter referred to as "retransmission"). The time required for retransmission increases consistently with the frame length.

As a result, the transmission efficiency may not be sufficiently improved simply by using A-MPDU.

BRIEF SUMMARY OF THE INVENTION

A wireless communication apparatus according to an aspect of the present invention includes:

a transmission section which transmits data using wireless communication; and a control section which controls a transmission rate for the transmission section, the control section limiting data size of data to be transmitted to at most a prescribed value and requesting a transmission acknowledgement, during a period from immediately after a change in the transmission rate until number of times that the transmission section transmits data reaches a prescribed number of times.

A wireless communication method according to an aspect of the present invention includes:

changing a data transmission rate according to a status of a transmission path;

starting counting number of times that data is transmitted, immediately after a change in a transmission rate; and limiting data size of data to be transmitted to at most a prescribed value and requesting transmission acknowledgement, during a period until the number of times that the data is transmitted reaches a prescribed number of times.

BRIEF DESCRIPTION OF THE SEVERAL VIEWS OF THE DRAWING

FIG. 7 is a timing chart showing how frames are transmitted and received in wireless communication;

FIG. 12 is a timing chart showing how frames are transmitted and received in wireless communication; and FIG. 13 is a timing chart showing how frames are transmitted and received in accordance with the wireless communication method according to the second embodiment.

DETAILED DESCRIPTION OF THE INVENTION

First Embodiment

Figure 1:
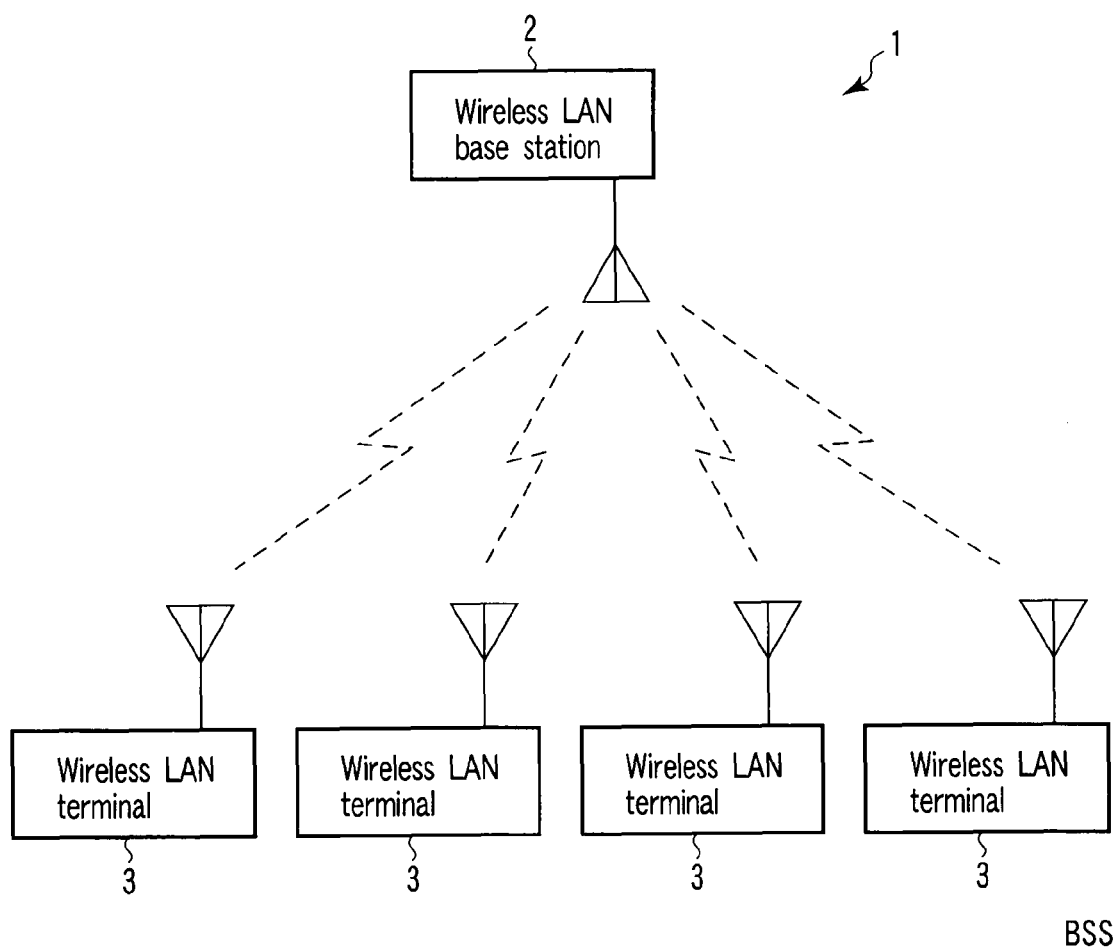
FIG. 1 is a block diagram of a wireless LAN system according to a first embodiment of the present invention.

A wireless communication apparatus and a wireless communication method according to a first embodiment of the present invention will be described. FIG. 1 is a block diagram of a wireless communication system according to the present embodiment.

As shown in FIG. 1, a wireless communication system 1 includes a wireless LAN base station (access point) 2 and a plurality of wireless LAN terminals 3. The wireless LAN base station 2 and the wireless LAN terminals 3 form a communication network (LAN). The wireless LAN terminal 3 communicates wirelessly with the wireless LAN base station 2 using a frequency band of 20 or 40 MHz. The wireless LAN base station 2 accommodates the wireless LAN terminals 3 to form a basic service set (BSS). The wireless LAN base station 2 is connected to a server (not shown in the drawings) by, for example, a wired LAN or to the Internet by metal lines, optical fibers, or the like via an Internet service provider.

<Configuration of the Wireless LAN Base Station 2 and the Wireless LAN Terminal 3>

Figure 2:
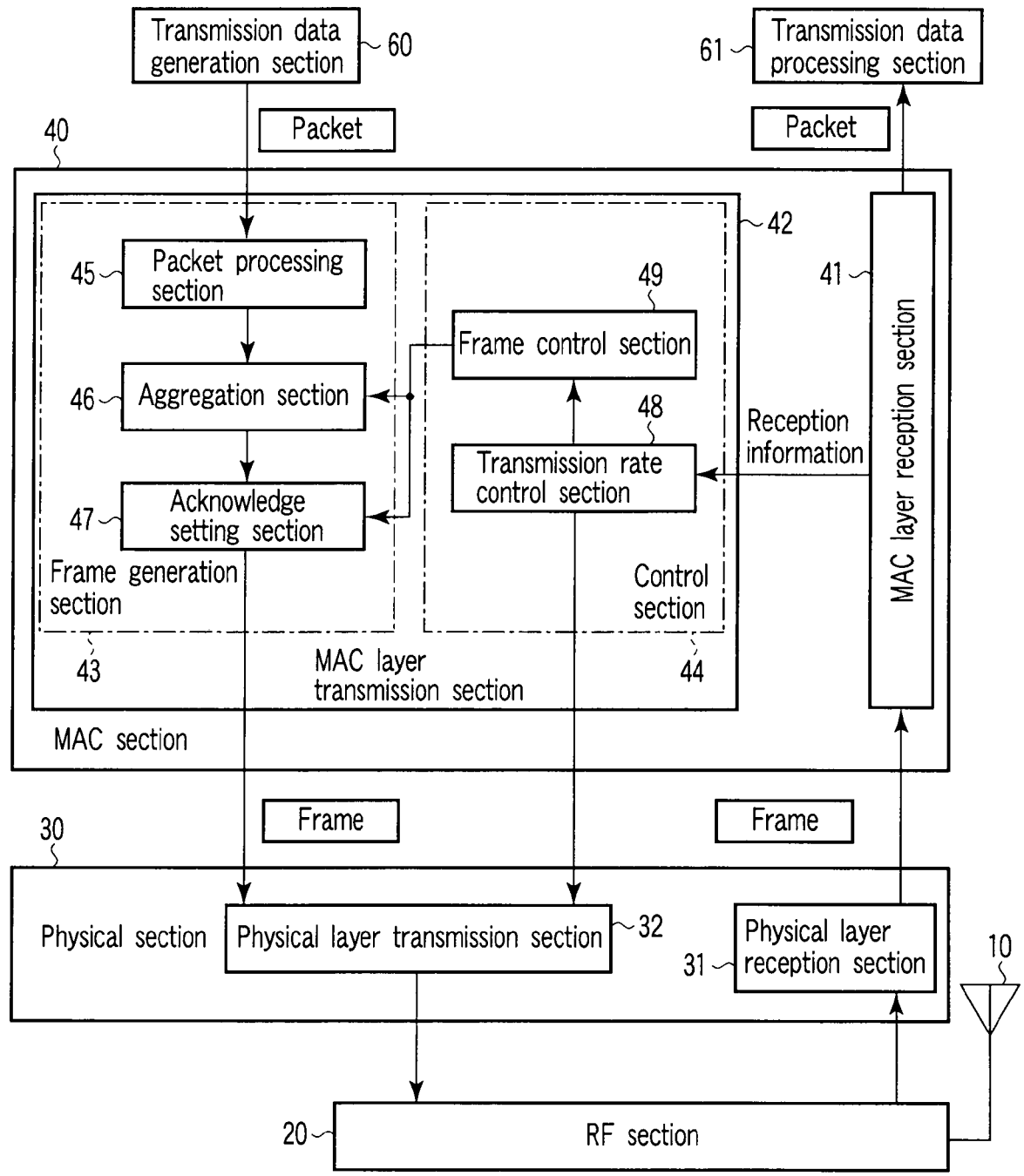
FIG. 2 is a block diagram of a wireless LAN base station and a wireless LAN terminal according to the first embodiment.

Now, the configuration of the wireless LAN base station 2 and wireless LAN terminal 3, described with reference to FIG. 3, will be described with reference to FIG. 2. The wireless LAN base station 2 and the wireless LAN terminal 3 have almost the same configuration. The configuration of the wireless LAN base station 2 will be described below by way of example. FIG. 2 is a block diagram of the wireless LAN base station 2. As shown in FIG. 2, the wireless LAN base station 2 roughly includes an antenna 10, a radio frequency (RF) section 20, a physical section 30, and a media access control (MAC) section 40.

The RF section 20 transmits and receives signals of a high frequency band used for communication on a wireless transmission path to, for example, amplify data in the transmitted and received analog signals. Then, the RF section 20 transmits and receives the data through an antenna 10.

The physical section 30 and the MAC section 40 process the transmission data and the reception data for a physical layer and a MAC layer. The physical section 30 and the MAC section 40 will be described below in detail.

First, the physical section 30 will be described. The physical section 30 includes a physical layer reception section 31 and a physical layer transmission section 32.

The physical layer reception section 31 performs an analog-to-digital conversion on a reception signal (analog signal) provided by the RF section 20 to obtain a digital signal. The physical layer reception section 31 further executes a demodulation process on the digital signal. That is, the physical layer reception section 31 performs, for example, orthogonal frequency division multiplexing (OFDM) and error correction decoding to obtain MPDUs as reception frames. The physical layer reception section 31 then outputs the reception frames obtained to the MAC section 40.

The physical layer transmission section 32 receives a transmission frame and a transmission rate from the MAC section 40. The physical layer transmission section 32 then performs redundant encoding and OFDM modulation on the received transmission frame and further carries out digital-to-analog conversion to obtain an analog signal. The physical layer transmission section 32 outputs the analog signal to the RF section 20 as a transmission signal. The physical layer transmission section 32 transmits the transmission frame to the wireless LAN terminal 3 via the RF section 20 and the antenna 10 at the transmission rate set by the MAC section 40.

Now, the MAC section 40 will be described. The MAC section 40 includes a MAC layer reception section 41 and a MAC layer transmission section 42.

First, the MAC layer reception section 41 will be described. The MAC layer reception section 32 receives a reception frame from the physical layer reception section 31. The MAC layer reception section 32 removes a MAC header from the reception frame to assemble the reception frame into a packet. The packet is a data structure into which transmission and reception data is assembled and which can be handled by a personal computer or the like. The frame is transmission and reception data assembled so as to be wirelessly communicated. The reception frame that is a data frame is further sent to a transmission data processing section 61 that executes processing for an upper layer. The transmission data processing section 61 is a block that executes specific processing using packets, and is, for example, a personal computer. The transmission data processing section 61 may be a part of the wireless LAN base station 2 (or the wireless LAN terminal 3) or may be located outside the wireless LAN base station 2 and connected to the wireless LAN base station 2 by metal lines, optical fibers, or the like. On the other hand, the reception frame that is a control frame or the like specified for a protocol process for the MAC layer is processed in the MAC layer reception section 41. An example of the control frame is an acknowledgment frame. The acknowledge frame will be described below. The transmission data processing section 61 outputs information such as retransmission control which is required for a transmission process to the MAC layer transmission section 42 as reception information.

Now, the MAC layer transmission section 42 will be described. As shown in FIG. 2, the MAC layer transmission section 42 includes a frame generation section 43 and a control section 44.

First, the frame generation section 43 will be described. The frame generation section 43 includes a packet processing section 45, an aggregation section 46, and an acknowledge setting section 47.

The packet processing section 45 receives packet as transmission data from a transmission data generation section 60. The transmission data generation section 60 is a block that generates transmission data, and is, for example, a personal computer similarly to the transmission data processing section 61. Thus, the transmission data generation section 60 may be a part of the wireless LAN base station 2 (or the wireless LAN terminal 3) or may be located outside the wireless LAN base station 2. The packet processing section 45 executes a transmission frame generation process such as addition of a MAC header to a packet to assemble the packet into a frame as an MPDU.

The aggregation section 46 aggregates a plurality of MPDUs provided by the packet processing section 45 as required. Thus, the plurality of MPDUs are generated into one A-MPDU. That is, the aggregation allows a plurality of frames to be transmitted as a single frame. The plurality of MPDUs contained in the same A-MPDU are managed on the basis of the same traffic ID. Whether or not the aggregation is to be performed depends on the frame. An instruction on the aggregation is given by, for example, the transmission data generation section 60. However, during a given period from immediately after a change in transmission rate, the aggregation is forcibly prohibited in accordance with an instruction from the control section 44. This will be described below in detail.

The acknowledge setting section 47 determines whether or not transmission acknowledgement is required for the MPDUs provided by the packet processing section 45 or the A-MPDU provided by the aggregation section 46. Information about whether or not to perform the transmission acknowledgement can be set in an "Ack Policy" field in the MAC header to set the frame to be an acknowledge expecting frame or an acknowledge non-expecting frame. Whether or not the transmission acknowledgement is required depends on the frame. An instruction on the aggregation is given by, for example, the transmission data generation section 60. However, during a given period from immediately after a change in transmission rate, the transmission acknowledgement is forcibly determined to be required in accordance with an instruction from the control section 44. This will also be described below in detail.

The frame generation section 43 obtains the single MPDU or A-MPDU into which the plurality of MPDUs are aggregated, on the basis of the above-described configuration to output MPDU or A-MPDU to the physical layer transmission section 32 as a transmission frame. In FIG. 2, the transmission data is shown to be transferred from the packet processing section 45 through the aggregation section 46 to the acknowledge setting section 47 in this order. However, the flow of data is not limited to this case, and any other configuration may be used provided that the above-described transmission frame is finally obtained.

Now, the control section 44 of the MAC layer transmission section 42 will be described. The control section 44 is a block that mainly manages information calculated from transmission and reception results and required for transmission, such as in retransmission control or transmission rate control. As shown in FIG. 2, the control section 44 includes a transmission rate control section 48 and a frame control section 49.

The transmission rate control section 48 determines the optimum transmission rate for transmission on the basis of indices such as packet error rate (PER). The transmission rate control section 48 notifies the physical layer transmission section 32 of the determined transmission rate together with the transmission frame. Upon setting the transmission rate to a value different from that of the transmission rate for the last frame transmitted, the transmission rate control section 48 communicates information indicating this to the frame control section 49 as a transmission rate change notification.

The frame control section 49 starts operation upon receiving the transmission rate change notification from the transmission rate control section 48. The frame control section 49 having started operation instructs the aggregation section 46 to inhibit the aggregation of frames for a given period. That is, the frame control section 49 instructs the aggregation section 46 to generate a frame as a signal MPDU. The frame control section 49 further instructs the acknowledge setting section 47 to set, in the Ack Policy field, information indicating that the transmission acknowledgement is to be performed for the given period. That is, the frame control section 49 instructs the acknowledge setting section 47 to generate frames as acknowledge expecting frames. That is, when the transmission rate is changed, the frame control section 49 instructs the frame generation section 43 to generate a frame both as a single MPDU and as an acknowledge expecting frame.

Figure 3:
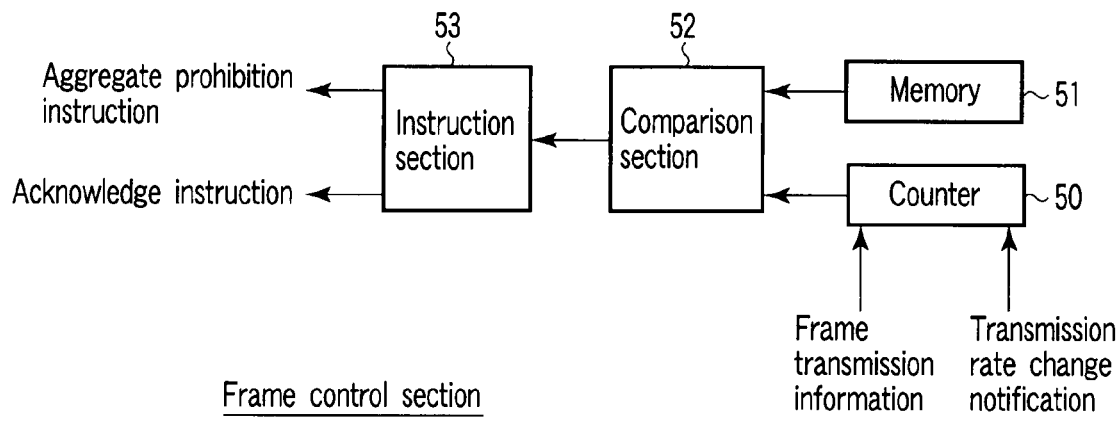
FIG. 3 is a block diagram of a frame control section according to the first embodiment.

FIG. 3 is a diagram showing the internal configuration of the frame control section 49. As shown in FIG. 3, the frame control section 49 includes a counter 50, a memory 51, a comparison section 52, and an instruction section 53. The components of the frame control section 49 start operation when the frame control section 49 receives the transmission rate change notification from the transmission rate control section 48.

The counter 50 receives, from the physical layer transmission section 32, information indicating that a frame have been transmitted (frame transmission information), and counts the number of times that the information has been received. That is, the counter starts counting the number of times that a frame has been transmitted, immediately after a change in transmission rate. The memory 51 holds the number of times that the aggregation has been inhibited. The comparison section 52 compares a counter value in the counter 50 with the number of inhibitions held in the memory 51.

If the comparison by the comparison section 52 indicates that the counter value in the counter 50 is smaller than the number of inhibitions, the instruction section 53 outputs an aggregation prohibition instruction to the aggregation section 46 and an acknowledge instruction to the acknowledge setting section 47. The aggregation prohibition instruction forces the aggregation section 46 to generate a frame as a single MPDU. The acknowledge instruction forces the acknowledge setting section 47 to generate acknowledge expecting frames.

That is, the frame control section 49 configured as described above inhibits the aggregation, with frames generated as acknowledge expecting frames, during the period from immediately after a change in transmission rate until the number of transmissions reaches the number of inhibitions.

<Transmission Acknowledgement>

Figure 4:
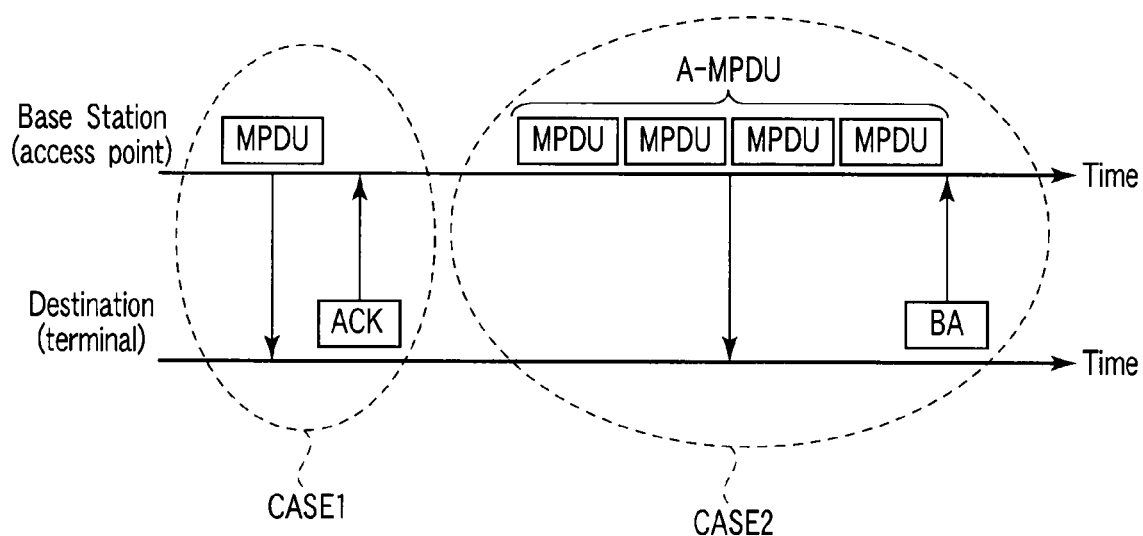
FIG. 4 is a timing chart showing how acknowledgement is performed in a wireless communication system according to the first embodiment.

Now, the transmission acknowledgement will be described with reference to FIG. 4. FIG. 4 is a timing chart showing how frames are transmitted and received between a frame transmission side (for example, the base station 2) and a frame reception side (for example, the terminal 3).

The IEEE 802.11 standards provide a transmission acknowledge function with which when a frame has been transmitted or received between the wireless LAN base station 2 and the wireless LAN terminal 3, the reception side notifies the transmission side whether or not the reception side has been able to successfully received the frame. For example, if the wireless LAN base station 2 transmits a frame to the wireless LAN terminal 3, which then successfully receives the frame, then the wireless LAN terminal 3 transmits an acknowledge frame to the wireless LAN base station 2. Thus, the wireless LAN base station 2 can determine whether or not the wireless LAN base station 2 has been able to correctly transmit the frame. If the wireless LAN base station 2 has failed to correctly transmit the frame, the wireless LAN base station 2, for example, retransmits the frame. On the basis of the information indicating whether or not the wireless LAN base station 2 has been able to correctly transmit the frame, the wireless LAN base station 2 can also determine the status of a wireless transmission path (congestion level). On the basis of the status of the wireless transmission path, the wireless LAN base station 2 can, for example, control the transmission rate.

CASE 1 in FIG. 4 shows that a frame is transmitted as a single MPDU. As shown in FIG. 4, when MPDU is transmitted to the terminal 3 as an acknowledge expecting frame, the terminal 3 having received MPDU transmits the acknowledge frame (ACK frame) to the base station 2.

CASE 2 in FIG. 4 shows that a frame is transmitted as A-MPDU. As shown in FIG. 4, when A-MPDU is transmitted to the terminal 3 as an acknowledge expecting frame, the terminal 3 having received A-MPDU transmits a block acknowledge (BA) frame to the base station 2. The BA frame is used for block transmission acknowledgement. The block transmission acknowledgement uses one acknowledge frame to acknowledge the transmission of A-MPDU containing a plurality of MPDUs. The BA frame contains information indicating which of MPDUs have been correctly received and which of MPDUs have failed to be correctly received.

<Data Transmission Method>

Figure 5:
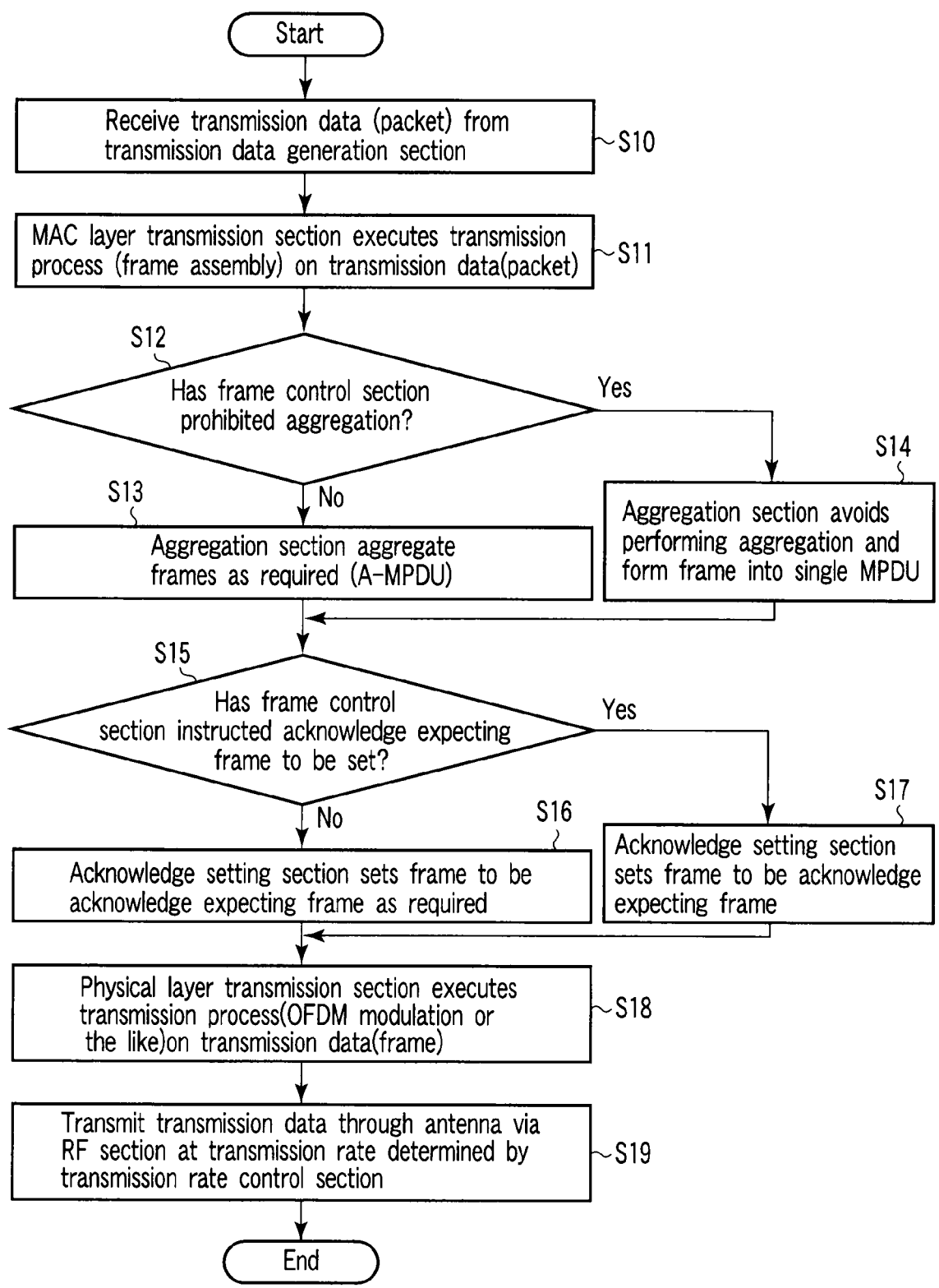
FIG. 5 is a flowchart of a wireless communication method according to the first embodiment.

Now, a data transmission method for the wireless LAN base station 2 and wireless LAN terminal 3 configured as described above will be described with reference to FIG. 5. FIG. 5 is a flowchart of the data transmission method. The data transmission method for the base station 2 is similar to that for the terminal 3. Transmission from the base station 2 to the terminal 3 will be described below by way of example.

First, the frame generation section 45 of the MAC layer transmission section 42 of the base station 2 receives transmission data (packets) from the transmission data generation section 60 (step S10).

The packet processing section 45 executes a transmission process on the received packets to assemble the packets into frames (step S11). If the aggregation has not been prohibited by the frame control section 49 (step S12, NO), the aggregation section 46 aggregates the frames to generate A-MPDU as required (step S13). If the aggregation is prohibited (step S12, YES), the aggregation section 46 does not perform the aggregation and generates a frame as a single MPDU (step S14).

If an instruction to set the acknowledge expecting frame has not been issued by the frame control section 49 (step S15, NO), the acknowledge setting section 47 sets any of the frames to be acknowledge expecting frames as required (step S16). If the instruction to set the acknowledge expecting frame has been issued by the frame control section 49 (step S15, YES), the acknowledge setting section 47 sets the frames to be acknowledge expecting frames (step S17).

If the aggregation has been prohibited by the frame control section 49, the instruction to set the acknowledge expecting frame has simultaneously been issued. If the instruction to set the acknowledge expecting frame has been issued by the frame control section 49, the aggregation has simultaneously been prohibited.

The transmission frame generated as described above is provided to the physical layer transmission section 32. The physical layer transmission section 32 executes a transmission process such as OFDM modulation, redundant encoding, or digital-to-analog conversion of the transmission frame (step S18). An analog signal resulting from the transmission process executed by the physical layer transmission section 32 is transmitted from the antenna 10 via the RF section 20 at the transmission rate determined by the transmission rate control section 48 (step S19).

<Details of the Operation of the Frame Control Section 49>

Figure 6:
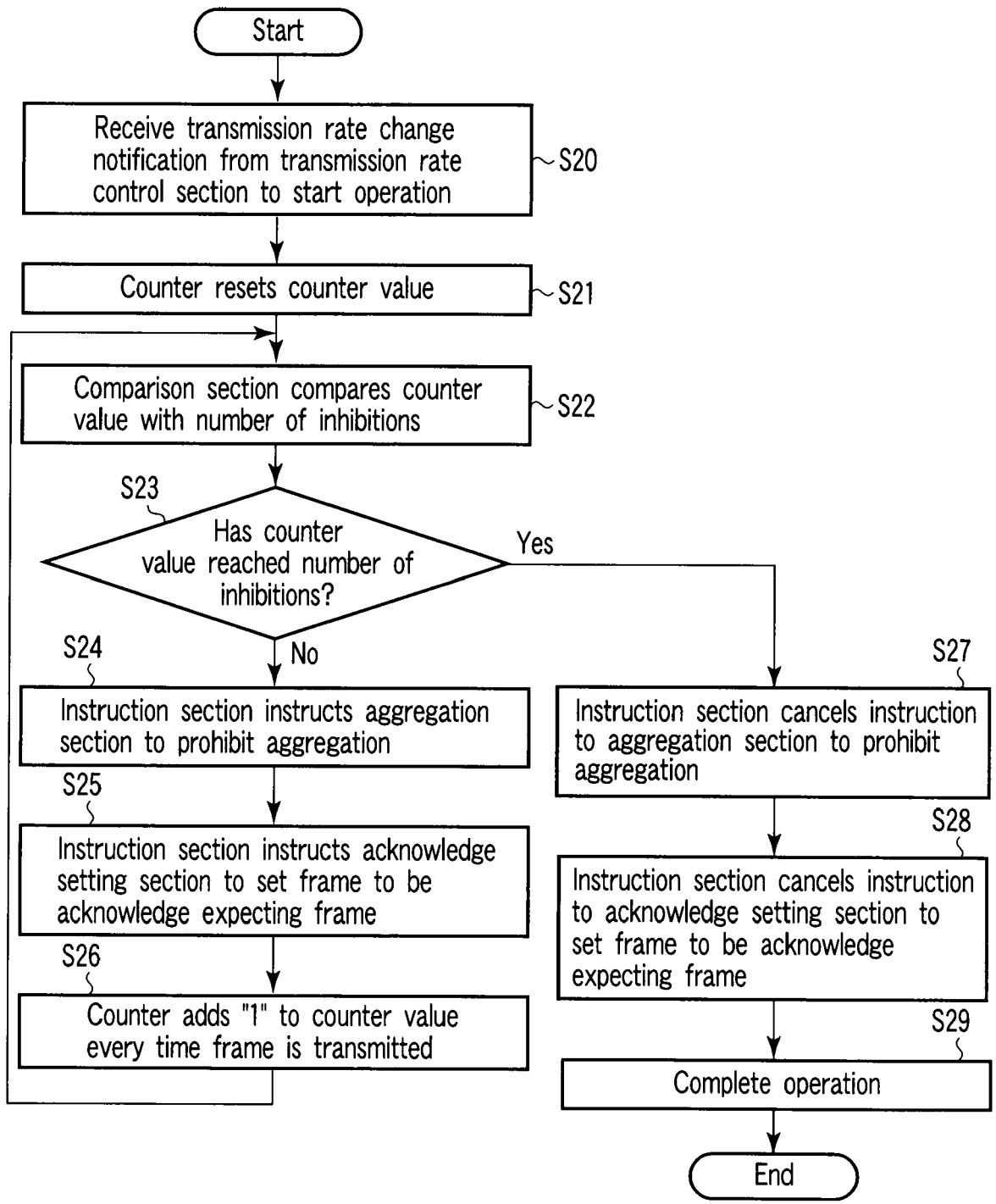
FIG. 6 is a flowchart showing the operation of a frame control section according to the first embodiment.

Now, the details of the operation of the frame control section 49 in the control section 44 of the MAC layer transmission section 42 will be described with reference to FIG. 6. FIG. 6 is a flowchart showing the operation of the frame control section 49.

As shown in FIG. 6, first, the frame control section 49 starts operation by receiving the transmission rate change notification from the transmission rate control section 48 (step S20). Then, the counter 50 resets the counter value to zero (step S21).

The comparison section 52 compares the counter value in the counter 50 with the number of inhibitions in the memory 51 (step S22). If the counter value has not reached the number of inhibitions (step S23, NO), the instruction section 53 instructs the aggregation section 46 to prohibit the aggregation (step S24). That is, the instruction section 53 outputs the aggregate prohibition instruction. The instruction section 53 further instructs the acknowledgement setting section 47 to set the acknowledgement expecting frame (step S25). That is, the instruction section 53 outputs the acknowledge acknowledgement instruction. Thereafter, every time a frame is transmitted, the counter 50 adds "1" to the counter value (step S26). The processing then returns to step S22.

If the comparison in step S22 indicates that the counter value has reached the number of inhibitions (step S23, YES), the instruction section 53 cancels the instruction to the aggregation section to prohibit the aggregation (step S27). That is, the instruction section 53 stops outputting the aggregate prohibition instruction. The instruction section 53 further cancels the instruction to the acknowledge setting section 47 to set the acknowledge expecting frame (step S28). That is, the instruction section 53 stops outputting the acknowledge instruction.

The instructions in steps S27 and S28 are given to the aggregation section 46 and the acknowledge setting section 47 to cancel the forcible setting and not to perform the aggregation or to avoid setting the acknowledge expecting frame. Thus, after step S27 and S28, the frame generation section 43 determines whether or not to perform the aggregation and whether or not to set the acknowledge expecting frame, on the basis of the normal control of the aggregation section 46 and the acknowledge setting section 47.

After steps S27 and S28, when the MAC layer transmission section 42 outputs the frame to the physical layer transmission section 32, the operation of the frame control section 49 is completed (step S29).

If the transmission rate control section changes the transmission rate while the frame control section 49 is in operation and the transmission rate change notification is output to the frame control section 49, the frame control section 49 returns to step S20 regardless of which of the steps in FIG. 6 is being executed. That is, the frame control section 49 starts the processing all over again.

<Effects>

As described above, the wireless communication apparatus and wireless communication method according to the first embodiment of the present invention enable the data transmission efficiency to be improved. This effect will be described below.

As described in the background, the IEEE 802.11n standards being formulated adopt A-MPDU. This is expected to allow data to be efficiently transmitted. However, A-MPDU is a plurality of MPDUs aggregated together and thus has an increased frame length. The increased frame length increases the time required to transmit a frame. Thus, the status of an actual wireless transmission path during transmission of the latter half of the frame may differ significantly from the result of estimation for the wireless transmission path performed by the physical section at a transmission of the head portion of the frame. That is, the status of the wireless transmission path (congestion level or the like) may vary significantly between the transmission of the former half of the frame and the transmission of the latter half. As a result, the transmission performance of the frame as a whole may be degraded. Therefore, even aggregating many MPDUs does not necessarily increase throughput.

Thus, it is very important for the IEEE 802.11n standards to use a link adaptation function used for the conventional wireless LAN system to adaptively control the transmission rate or the like according to the status of communication. The general link adaptation function uses, for example, PER of a frame to be transmitted and received as an index to perform control such that a transmission rate lower than the current one is selected if the error rate exceeds a certain given PER. This reduces the error rate to ensure the appropriate general transmission efficiency. The relationship between the transmission rate and PER is basically such that the error rate decreases consistently with the transmission rate. In contrast, if the error rate is sufficiently low at a certain transmission rate and is expected to be at a certain small value even at an increased transmission rate, the throughput is increased by switching to a higher transmission rate. Thus, the link adaptation function also controllably switches the transmission rate to a higher one using a certain index.

However, the conventional link adaptation function poses the following problems. That is, if a transmission rate lower than the current one is selected, the error rate of the transmission rate is expected to be lower than the current one after the change. However, if a transmission rate higher than the current one is selected, determining whether or not the error rate falls within a tolerable range after the change is difficult. That is, predicting whether or not communication is possible at an increased transmission rate is difficult. Thus, at present, the following operation needs to be performed: in spite of the risk of disabling communication, the transmission rate is switched to a higher one, and an attempt is then made to perform the actual communication to determine whether or not the communication is possible.

If the communication is found to be difficult at the increased transmission rate after the switching, then importantly, the transmission rate is immediately set back to the original value to inhibit a temporal decrease in throughput.

Furthermore, when the transmission rate is switched to a lower one owing to a high error rate or the like, what level of the reduced transmission rate is to be selected is determined by switching the transmission rate and then observing the communication status. Then, a further reduced transmission rate needs to be selected as required. Thus, even in this case, immediate determination is important though the possible problem is less serious than in the case in which the transmission rate is switched to a higher one.

As described above, the IEEE 802.11n standards use A-MPDU, resulting in the tendency to increase the frame length. Thus, the above-described problem becomes serious. This will be described with reference to FIG. 7. FIG. 7 is a timing chart of the conventional wireless communication method using A-MPDU to transmit data. FIG. 7 shows how frames are transmitted and received between the transmission side (for example, the wireless LAN base station) and the reception side (for example, the wireless LAN terminal) as well as transmission rates used.

As shown in FIG. 7, the wireless LAN base station is communicating wirelessly with the wireless LAN terminal at a transmission rate of 117 Mbps. First, the base station successfully transmits A-MPDU1 obtained by aggregating MPDU1 to MPDU4 and receives a BA frame from the terminal.

It is assumed that at a time t1, the base station increases the transmission rate from 117 Mbps to 130 Mbps on the basis of the improved PER or the like and transmits A-MPDU2 obtained by aggregating MPDU5 to MPDU9, at the increased transmission rate. However, it is assumed that since the transmission rate of 130 Mbps is actually excessively high, the base station fails to transmit A-MPDU2. Then, the terminal cannot receive A-MPDU2 and thus does not transmit the BA frame.

The base station fails to receive the BA frame for A-MPDU2, to determine that communication is impossible at the transmission rate of 130 Mbps. Thus, at a time t2, the base station sets the transmission rate back to 117 Mbps and retransmits A-MPDU2 at the resulting transmission rate.

In the above-described example, A-MPDU2 containing the five MPDUs and thus having a long frame length needs to be transmitted in order to determine whether or not communication is possible at 130 Mbps. Then, if the transmission fails, A-MPDU2 with the long frame length needs to be transmitted again. That is, A-MPDU2 needs to be transmitted twice, resulting in a very large overhead. As a result, communication efficiency decreases.

Figure 8:
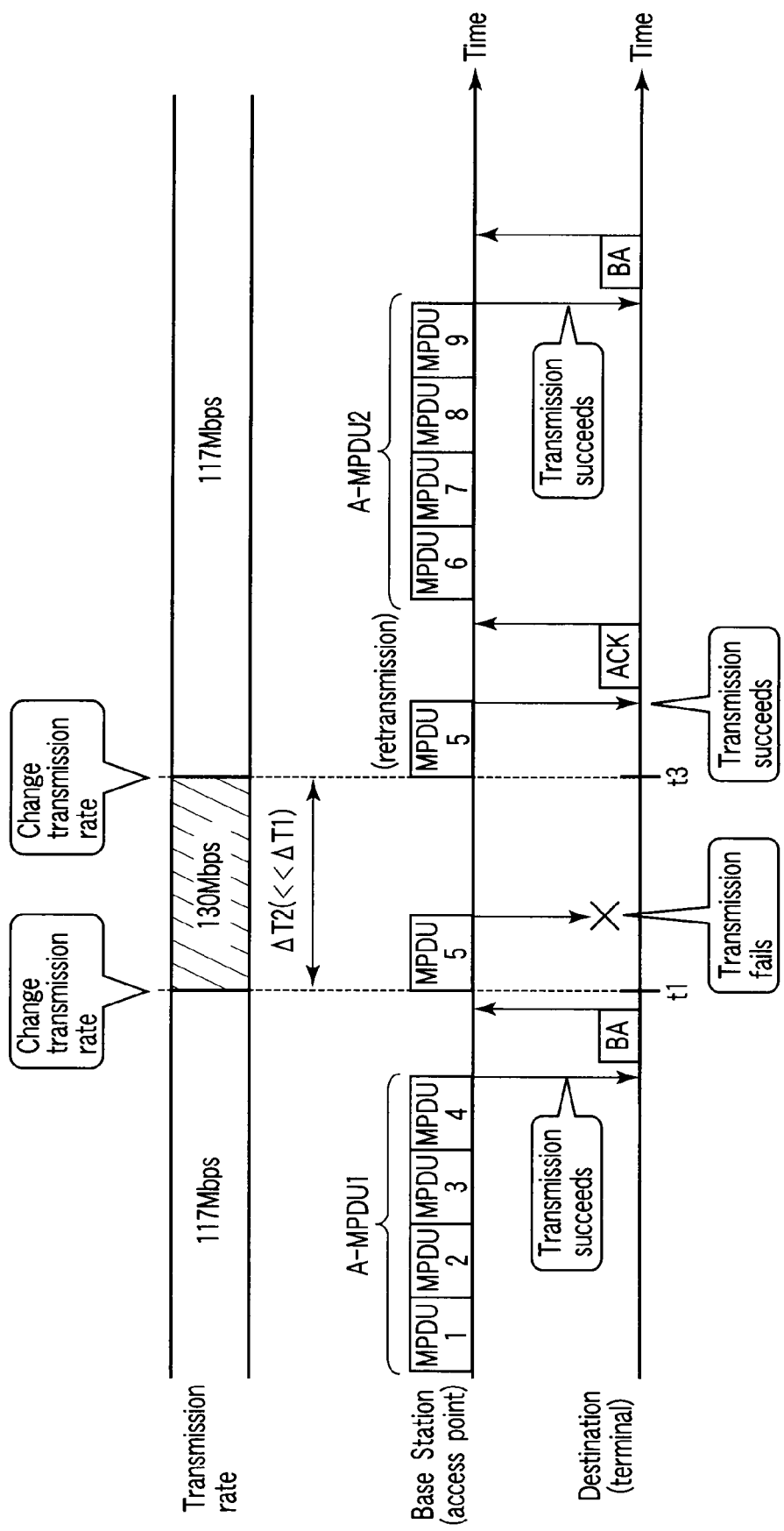
FIG. 8 is a timing chart showing how frames are transmitted and received in accordance with the wireless communication method according to the first embodiment.

In this connection, the configuration according to the present embodiment transmits the frame that is a single MPDU and a frame requesting an acknowledge frame, immediately after the transmission rate is switched. Thus, the overhead can be reduced. That is, whether or not communication is possible can be quickly determined after the transmission rate has been switched, enabling the communication efficiency to be improved. This effect will be described with reference to FIG. 8. FIG. 8 is a timing chart of data transmission according to the wireless communication method according to the present embodiment. FIG. 8 shows how frames are transmitted and received between the transmission side (for example, the wireless LAN base station 2) and the reception side (for example, the wireless LAN terminal 3) as well as transmission rates used. FIG. 8 also shows that inhibition is performed once (the number of inhibitions is one).

As shown in FIG. 8 and as described with reference to FIG. 7, the base station 2 transmits A-MPDU1 to the terminal 3 at a transmission rate of 117 Mbps and receives the BA frame from the terminal 3. Thereafter, at time t1, the base station 2 increases the transmission rate to 130 Mbps.

Then, in the base station 2, the frame control section 49 outputs the aggregate prohibition instruction and the acknowledge instruction. Consequently, the frame transmitted at time t1 is a single MPDU5, which is transmitted to the terminal 3 as an acknowledge expecting frame. Upon failing to transmit MPDU5, the base station 2 cannot receive the ACK frame for MPDU5.

Thus, the base station 2 determines that communication at 130 Mbps is difficult. Then, at a time t3, the base station 2 sets the transmission rate back to 117 Mbps and retransmits the frame at the resulting transmission rate. Even at this point in time, the frame control section 49 outputs the aggregate prohibition instruction and the acknowledge instruction because of the change in transmission rate. Consequently, the frame transmitted at time t3 is the single MPDU5, which is transmitted to the terminal 3 as an acknowledge expecting frame. When MPDU5 is retransmitted at time t3, the counter value in the counter 50 becomes equal to the number of inhibitions. The frame control section 49 stop outputting the aggregate prohibition instruction and the acknowledge instruction.

The base station 2 then receives the ACK frame to recognize that MPDU5 has been successfully transmitted. The base station 2 then transmits the remaining MPDU6 to MPDU9 to the terminal 3 as A-MPDU2. The base station 2 thereafter receives the BA frame for A-MPDU2 from the terminal 3.

With the method according to the present embodiment, the period during which communication is difficult, that is, the period during which the transmission rate is 130 Mbps, is ΔT2 from time t1 to time t3, which is shorter than ΔT1 from time t1 to time t2 in FIG. 7. Furthermore, according to the present embodiment, the frame to be retransmitted is the single MPDU, reducing the time required for retransmission, compared to the case in which A-MPDU2 is retransmitted as shown in FIG. 7. Moreover, immediately after the change in transmission rate, MPDU5 is transmitted as a frame requesting the ACK frame. Thus, whether or not the terminal 3 has successfully received the frame can be determined. Consequently, the status of the wireless transmission path immediately after the change in transmission rate can be appropriately determined.

Thus, according to the present embodiment, when the transmission rate is switched by the link adaptation function, the status of the wireless transmission path can be quickly determined. As a result, if the transmission rate is switched to a higher one and communication is difficult at the resulting transmission rate, the transmission rate can be immediately set back to the original one. A possible decrease in throughput can thus be inhibited. Furthermore, if the transmission rate is switched to a lower one, communication is still difficult at the resulting transmission rate, and the transmission rate thus needs to be changed to a further reduced one, then the transmission rate can further be immediately switched. A possible decrease in throughput can be inhibited. Moreover, since the frame to be retransmitted is the single MPDU, useless time required for retransmission can be reduced. As a result, the data transmission efficiency of the wireless communication apparatus can be improved.

Second Embodiment

Now, a wireless communication apparatus and a wireless communication method according to a second embodiment of the present invention will be described. The present embodiment relates to the above-described first embodiment which transmits frames without performing the aggregation. Only differences from the first embodiment will be described below.

<Configuration of the Wireless LAN Base Station 2 and the Wireless LAN Terminal 3>

Figure 9:
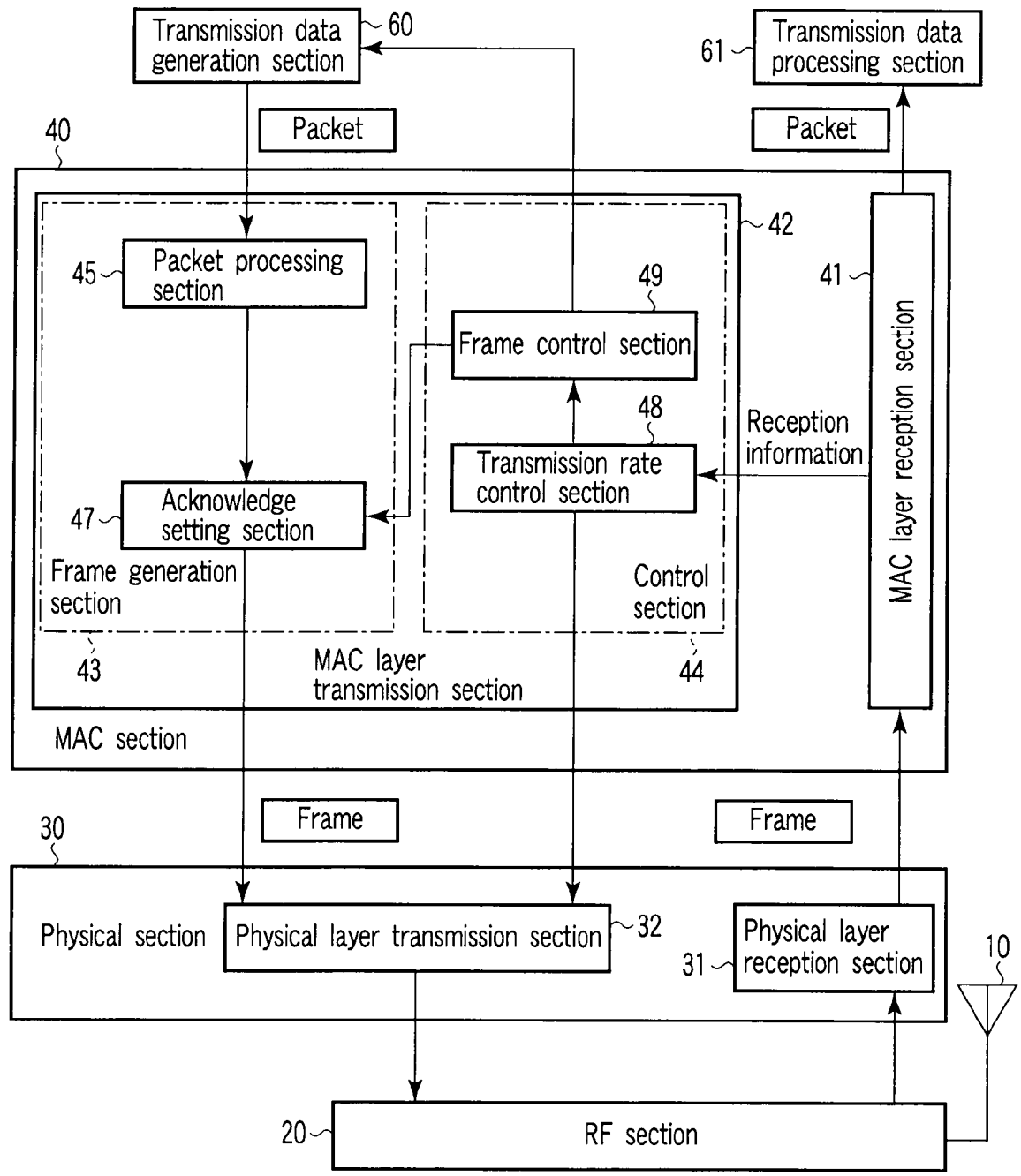
FIG. 9 is a block diagram of a wireless LAN base station and a wireless LAN terminal according to a second embodiment of the present invention.

First, the configuration of the wireless LAN base station 2 and wireless LAN terminal 3 according to the present embodiment will be described with reference to FIG. 9. As is the case with the first embodiment, the wireless LAN base station 2 and the wireless LAN terminal 3 have almost the same configuration. The configuration of the wireless LAN base station 2 will be described below by way of example. FIG. 9 is a block diagram of the wireless LAN base station 2.

As shown in FIG. 9, the wireless LAN base station 2 has the configuration shown in FIG. 2, described in the first embodiment, and in which the aggregation section 46 is omitted. Thus, the frame generation section 43 does not aggregate MPDUs but generates a frame as a single MPDU.

The frame control section 49 in the control section 44 outputs, instead of the aggregate prohibition instruction, an instruction to limit the data size of transmission data to at most a prescribed value (limitation instruction), to the transmission data generation section 60. That is, upon receiving the transmission rate change notification from the transmission rate control section, the frame control section 49 outputs the limitation instruction to the transmission data generation section 60 and the acknowledge instruction to the acknowledge setting section 47, for a given period.

The frame control section 49 has the internal configuration shown in FIG. 3, described in the first embodiment and in which the aggregate prohibition instruction is replaced with the limitation instruction. The memory 51 holds the number of times that a frame with the data size limited has been transmitted (this number of times is also hereinafter referred to as the number of inhibitions).

The remaining part of the configuration is similar to that in the first embodiment.

<Data Transmission Method>

Figure 10:
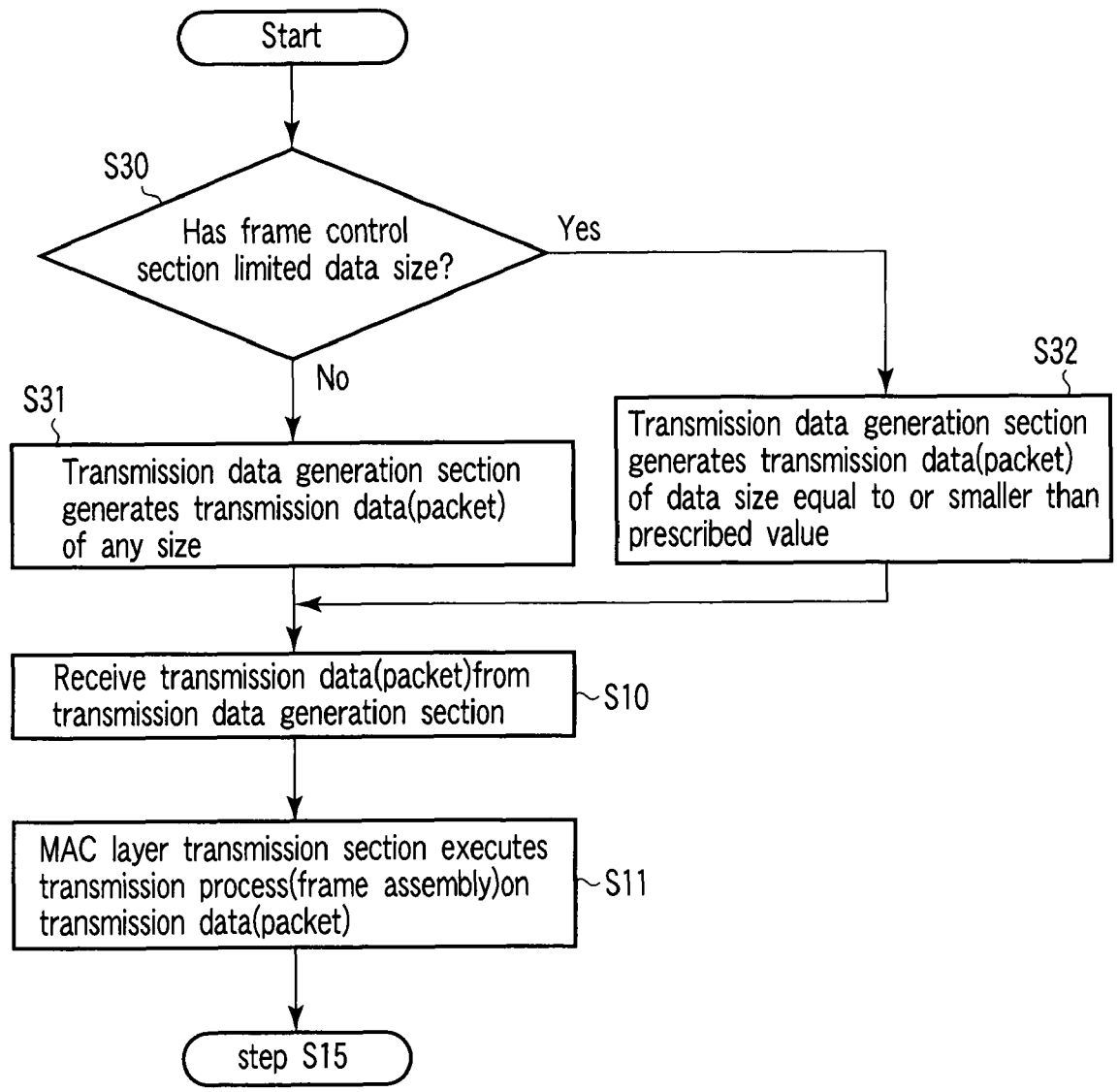
FIG. 10 is a flowchart of a wireless communication method according to the second embodiment.

Now, a data transmission method for the wireless LAN base station 2 and the wireless LAN terminal 3 according to the present embodiment will be described with reference to FIG. 10. FIG. 10 is a flowchart of the data transmission method. FIG. 10 is a flowchart of the data transmission method. The data transmission method for the base station 2 is similar to that for the terminal 3. Transmission from the base station 2 to the terminal 3 will be described below by way of example.

First, if the frame control section 49 has not output the limitation instruction (step S30, NO), the transmission data generation section 60 generates transmission data (packet) with any data size (step S31). On the other hand, if the limitation instruction has been output (step S30, YES), the transmission data generation section 60 generates transmission data with a data size equal to or smaller than a prescribed value (step S32). The prescribed value may be preset in the transmission data generation section 60 or provided by the frame control section 49 together with the limitation instruction.

The packet processing section 45 receives the transmission data generated in step S31 or S32 (step S10). The packet processing section 45 then executes the transmission process to assemble the data into frames (step S11). Thereafter, the steps following step S15 as described in the first embodiment are executed.

<Details of the Operation of the Frame Control Section 49>

Figure 11:
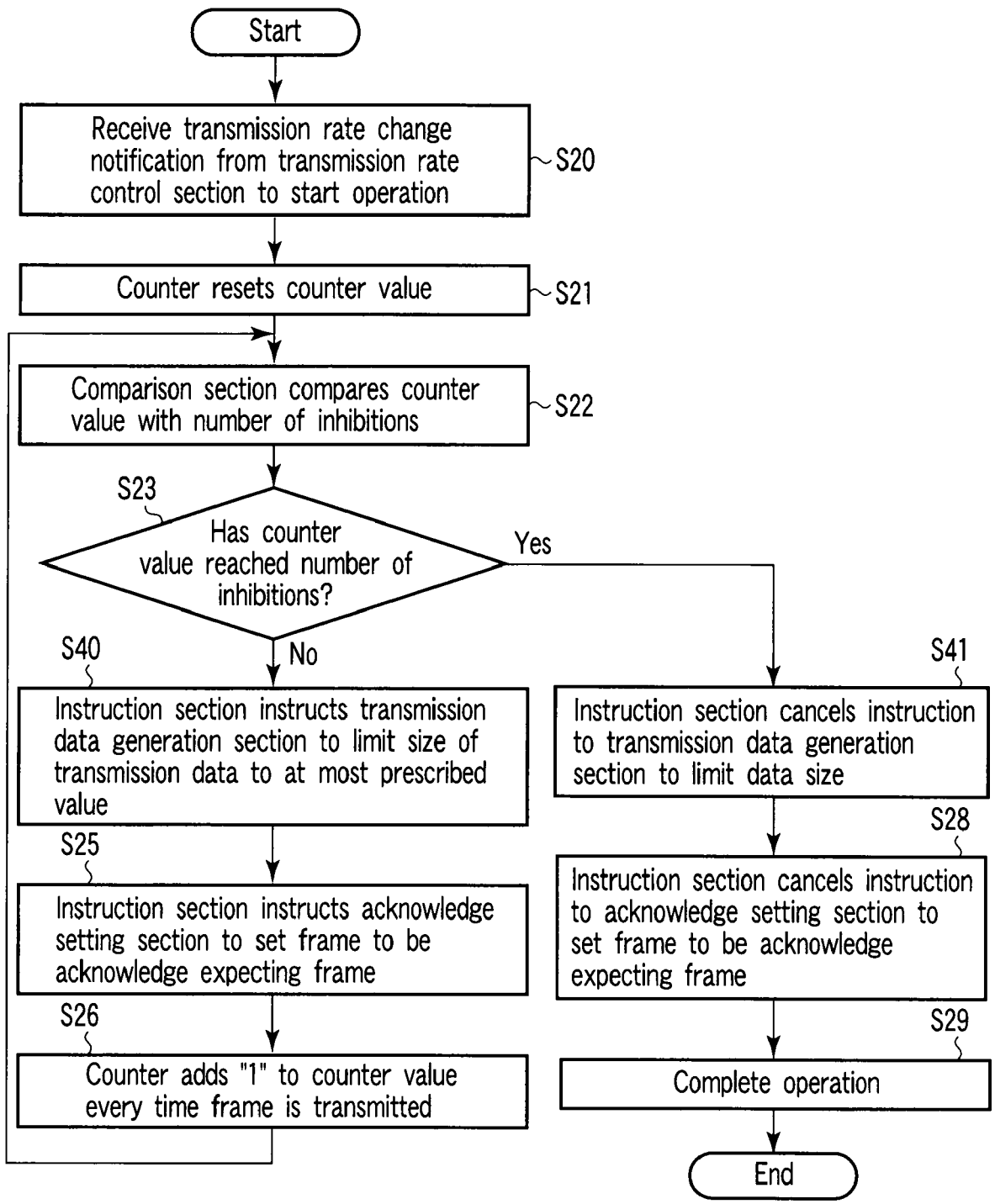
FIG. 11 is a flowchart showing the operation of a frame control section according to the second embodiment.

Now, the details of the operation of the frame control section 49 according to the present embodiment will be described with reference to FIG. 11. FIG. 11 is a flowchart showing the operation of the frame control section 49.

As shown in FIG. 11, the operation of the frame control section 49 according to the present embodiment corresponds to the operation illustrated in the flowchart in FIG. 6, described in the first embodiment, except that the processing in steps S24 and S27 is replaced with processing relating to the limitation instruction.

That is, if the counter value fails to reach the number of inhibitions after the processing in steps S20 to S22 (step S23, NO), the instruction section 53 instructs the transmission data generation section 60 to limit the size of the transmission data to at most the prescribed value (step S40). That is, the instruction section 53 outputs the limitation instruction. The processing thereafter proceeds to step S25.

In contrast, if the counter value reaches the number of inhibitions (step S23, YES), the instruction section 53 instructs the transmission data generation section 60 to cancel the limitation of the size of the transmission data (step S41). That is, the instruction section 53 stops outputting the limitation instruction.

Thus, the transmission data generation section 60 can generate transmission data with any data size. The processing thereafter proceeds to step S28.

<Effects>

As described above, the wireless communication apparatus and the wireless communication method according to the second embodiment of the present invention exert effects similar to those of the first embodiment even for a wireless LAN system that does not aggregate frames. This effect will be described below in detail.

In general, the size of a transmission frame depends on the size of transmission data except when the size is preset to a given value. That is, the size of the frame increases consistently with the data size of the transmission data. Namely, the increased data size increases frame length, resulting in the need for a long time for transmission of the frame. Thus, in this case, a problem occurs which is similar to that described in the first embodiment. This will be described with reference to FIG. 12. FIG. 12 is a timing chart of data transmission according to the conventional wireless communication method. FIG. 12 shows how frames are transmitted and received between the transmission side (for example, the wireless LAN base station) and the reception side (for example, the wireless LAN terminal) as well as transmission rates used. The data size (frame length) of each frame is shown as the length along the time axis of the frames in the FIG. 12.

As shown in FIG. 12, the wireless LAN base station is communicating wirelessly with the wireless LAN terminal using a transmission rate of 117 Mbps. First, the base station successfully transmits a frame F1 and receives the ACK frame from the terminal. It is assumed that at time t1, the base station increases the transmission rate from 117 Mbps to 130 Mbps and transmits a frame F2 with a relatively large frame size at the increased transmission rate. However, it is then assumed that the base station fails to transmit frame F2. Thus, at time t2, the base station sets the transmission rate back to 117 Mbps and retransmits frame F2 at the resulting transmission rate.

In the above-described example, whether or not communication is possible at 130 Mbps cannot be determined until the transmission of frame F2 with the long frame length is completed. If as a result, frame F2 cannot be transmitted, frame F2 with the long frame length needs to be transmitted again. That is, a problem occurs which is similar to that occurring when A-MPDU2 is transmitted at the transmission rate of 130 Mbps.

In this connection, in the configuration according to the present embodiment, the frame transmitted immediately after the switching of the transmission rate has a frame size equal to or smaller than the prescribed, that is, a relatively small frame size. The frame further requests the acknowledge frame. Thus, the above-described possible overhead can be reduced. This effect will be described with reference to FIG. 13. FIG. 13 is a timing chart of data transmission in accordance with the wireless communication method according to the present embodiment. FIG. 13 shows how frames are transmitted and received between the transmission side (for example, the wireless LAN base station 2) and the reception side (for example, the wireless LAN terminal 3) as well as transmission rates used. The data size (frame length) of each frame is shown as a length along the time axis of the frames in the FIG. 13. FIG. 13 also shows that inhibition is performed once (the number of inhibitions is one).

As shown in FIG. 13, when the base station 2 increases the transmission rate to 130 Mbps, the frame control section 49 outputs the limitation instruction and the acknowledge instruction. Thus, a frame F2' transmitted at time t1 is for transmission data with a data size limited to at most the prescribed value, and has a relatively small frame length. Furthermore, frame F2' is transmitted to the terminal 3 as an acknowledge expecting frame. Upon failing to transmit frame F2', the base station cannot receive the ACK frame for MPDU5.

Thus, the base station 2 determines that communication at 130 Mbps is difficult. Then, at the time t3, the base station 2 sets the transmission rate back to 117 Mbps and retransmits the frame at the resulting transmission rate. Even at this point in time, the frame control section 49 outputs the limitation instruction and the acknowledge instruction because of the change in transmission rate. Consequently, the frame transmitted at time t3 has its data size limited; frame F2' is retransmitted. Then, the counter value in the counter 50 becomes equal to the number of inhibitions. As a result, the limitation instruction and the acknowledge instruction are canceled, with the remaining frame F3 transmitted.

With the method according to the present embodiment, the period during which communication is difficult, that is, the period during which the transmission rate is 130 Mbps, is ΔT2 from time t1 to time t3, which is shorter than ΔT1 from time t1 to time t2 in FIG. 12. Furthermore, according to the present embodiment, the frame to be retransmitted is frame F2' with the short frame length, reducing the time required for retransmission, compared to the case in which frame F2 with the long frame length is retransmitted as shown in FIG. 12.

Therefore, the present embodiment exerts effects similar to those of the first embodiment.

As described above, with the wireless communication apparatus and the wireless communication method according to the first and second embodiments of the present invention, when the frame transmission rate is switched by the link adaptation function or the like according to the communication status, the frame with the short frame length is transmitted immediately after the switching. Moreover, the transmitted frame requires an acknowledgement frame. In particular, if the A-MPDU function according to the IEEE 802.11n standards is used, the frame length is reduced by inhibiting the aggregation when the transmission rate is switched. This enables quick determination of whether or not communication is possible at the switched transmission rate. As a result, the data transmission efficiency can be improved.

That is, the wireless communication apparatus according to the above-described embodiments includes the transmission section 32 which transmits data using wireless communication; and the control section 44 which controls the transmission rate for the transmission section 32, the control section limiting the data size of data to be transmitted to at most the prescribed value and requesting a transmission acknowledgement, during the period from immediately after a change in the transmission rate until the number of times that the transmission section transmits data reaches the prescribed number of times.

According to the first embodiment, the apparatus further includes the frame generation section 43 which generates a frame of the data to be transmitted and which aggregates a plurality of the frames, and the transmission section 32 transmits the frame generated by the frame generation section 43 or the plurality of frames aggregated by the frame generation section 43. Furthermore, during the period until the number of times that the frame is transmitted reaches the prescribed number of times, the control section 44 prohibits the frame generation section 43 from aggregating the frames, while instructing the frame generation section to generate the frame as a frame requesting the transmission acknowledgement.

According to the second embodiment, the apparatus further includes the frame generation section 43 which generates a frame of data received from the data generation section 60 generating the data to be transmitted, and the transmission section 32 transmits the frame generated by the frame generation section 43. Furthermore, during the period until the number of times that the frame is transmitted reaches the prescribed number of times, the control section 44 instructs the data generation section 60 to limit the data size of the data to be transmitted to at most the prescribed value, while instructing the frame generation section 43 to generate the frame as a frame requesting the transmission acknowledgement.

The wireless communication method according to the above-described embodiments includes changing the data transmission rate according to the status of the transmission path; starting counting the number of times that the data is transmitted, immediately after the change in the transmission rate; and limiting the data size of data to be transmitted to at most the prescribed value and requesting the transmission acknowledgement, during the period until the number of times that the data is transmitted reaches a prescribed number of times.

According to the first embodiment, the data to be transmitted is assembled into a frame for transmission. Furthermore, by preventing frames from being aggregated during the period until the number of times that the frame is transmitted reaches the prescribed number of times, the data size of the data to be transmitted is limited to at most the prescribed value. After the number of times that the frame is transmitted reaches the prescribed number of times, the aggregation of the frames is permitted.

According to the second embodiment, the data to be transmitted is assembled into a frame for transmission. Furthermore, during the period until the number of times that the frame is transmitted reaches the prescribed number of times, the data generation section 60 generating the data to be transmitted is instructed to limit the data size of the data to be transmitted to at most the prescribed value. After the number of times that the frame is transmitted reaches the prescribed number of times, the data generation section is instructed to generate data of a data size greater than the prescribed value.

In the above-described embodiments, 117 Mbps and 130 Mbps are used as the transmission rate. However, these transmission rates are only illustrative, and other transmission rates may be used. Furthermore, in the example in the above-described embodiments, the transmission fails when the transmission rate is switched to the higher one. However, the embodiments are also applicable to the case in which the transmission rate is switched to a lower one. In this case, the transmission rate is switched to a further reduced one.

Furthermore, in the above-described embodiments, the wireless LAN base station 2 transmits a frame to the wireless LAN terminal 3, and the wireless LAN terminal 3 changes the transmission rate. However, the embodiments are similarly applicable to the case in which the wireless LAN terminal 3 transmits a frame to the wireless LAN base station 2 and in which the wireless LAN terminal 3 changes the transmission rate.

Moreover, in the above-described embodiments, the frame control section 49 is configured as shown in FIG. 3. However, the present embodiments are not limited to the case in which the frame control section 49 is implemented as hardware. The frame control section 49 may be implemented as software provided that the frame control section 49 can operate as shown in FIGS. 6 and 11.

Additionally, instead of counting up when the physical layer transmission section 32 transmits a frame, the counter 50 may count up upon receiving the acknowledge frame (ACK frame) from the destination of the frame in response to the transmitted frame. That is, the counter 50 may count the number of times that the frame has successfully been transmitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a transmission section which transmits data using wireless communication;
a control section which controls a transmission rate for the transmission section, the control section limiting data size of data to be transmitted to at most a prescribed value and requesting a transmission acknowledgement, during a period from immediately after a change in the transmission rate until number of times that the transmission section transmits data reaches a prescribed number of times; and
a frame generation section which generates a frame of the data to be transmitted and which aggregates a plurality of the frames,
wherein the transmission section transmits the frame generated by the frame generation section or the plurality of frames aggregated by the frame generation section, and
during the period until the number of times that the frame is transmitted reaches the prescribed number of times, the control section prohibits the frame generation section from aggregating the frames, while instructing the frame generation section to generate the frame as a frame requesting the transmission acknowledgement.

2. The apparatus according to claim 1, wherein the control section includes:
a counter which starts counting the number of times that the frame is transmitted, immediately after the change in the transmission rate;
a comparison section which compares a counter value in the counter with the prescribed number of times; and
an instruction section which prohibits the frame generation section from aggregating the frames if the comparison by the comparison section shows that the counter value is less than the prescribed number of times.

3. The apparatus according to claim 1, wherein the frame generation section includes:
a generation section which generates the frame;
an aggregation section which aggregates a plurality of the frames generated by the frame generation section; and
a setting section which sets the transmission acknowledgement for the single frame generated by the frame generation section or a plurality of the frames aggregated by the aggregation section,
wherein during the period until the number of times that the frame is transmitted reaches the prescribed number of times, the control section prohibits the aggregation section from aggregating the frames, while instructing the setting section to set the transmission acknowledgement for the frames.

4. The apparatus according to claim 1, wherein the aggregated plurality of frames are managed on the basis of the same traffic ID.

5. The apparatus according to claim 1, wherein the control section uses a packet error rate as an index to determine the transmission rate.

6. The apparatus according to claim 1, wherein the frame is a MAC protocol data unit.

7. A wireless communication apparatus comprising:
a transmission section which transmits data using wireless communication;
a control section which controls a transmission rate for the transmission section, the control section limiting data size of data to be transmitted to at most a prescribed value and requesting a transmission acknowledgement, during a period from immediately after a change in the transmission rate until number of times that the transmission section transmits data reaches a prescribed number of times; and
a frame generation section which generates a frame of data received from a data generation section generating the data to be transmitted,
wherein the transmission section transmits the frame generated by the frame generation section, and
during the period until the number of times that the frame is transmitted reaches the prescribed number of times, the control section instructs the data generation section to limit the data size of the data to be transmitted to at most the prescribed value, while instructing the frame generation section to generate the frame as a frame requesting the transmission acknowledgement.

8. The apparatus according to claim 7, wherein the transmission section transmits one of the frames during every transmission without aggregating the frames.

9. The apparatus according to claim 7, wherein the control section includes:
the counter which starts counting the number of times that the frame is transmitted, immediately after the change in the transmission rate;
the comparison section which compares a counter value in the counter with the prescribed number of times; and
an instruction section which instructs the data generation section to limit the data size of the transmission data to at most the prescribed value if the comparison by the comparison section shows that the counter value is less than the prescribed number of times.

10. The apparatus according to claim 7, wherein the frame generation section includes:
a generation section which receives the transmission data from the data generation section to generate the frame; and
a setting section which sets the transmission acknowledgement for the single frame generated by the frame generation section, wherein during the period until the number of times that the frame is transmitted reaches the prescribed number of times, the control section instructs the setting section to set the transmission acknowledgement for the frame.

11. The apparatus according to claim 7, wherein the control section limits the data size to at most the prescribed value to set a frame length of the frame generated by the frame generation section to at most a predetermined given value.

12. The apparatus according to claim 7, wherein the frame is the MAC protocol data unit.

13. The apparatus according to claim 7, wherein the control section uses a packet error rate as an index to determine the data transmission rate.

14. A wireless communication method comprising:
  changing a data transmission rate according to a status of a transmission path;
  starting counting number of times that data is transmitted, immediately after a change in a transmission rate; and
  limiting data size of data to be transmitted to at most a prescribed value and requesting transmission acknowledgement, during a period until the number of times that the data is transmitted reaches a prescribed number of times,
  wherein the data to be transmitted is assembled into a frame for transmission, and
  by preventing frames from being aggregated during the period until the number of times that the frame is transmitted reaches the prescribed number of times, the data size of the data to be transmitted is limited to at most the prescribed value,
  the method further comprising permitting aggregation of the frames after the number of times that the frame is transmitted reaches the prescribed number of times.

15. The method according to claim 14, wherein the data transmission rate is determined using a packet error rate as an index.

16. The method according to claim 14, wherein the frame is a MAC protocol data unit.

17. A wireless communication method comprising:
  changing a data transmission rate according to a status of a transmission path;
  starting counting number of times that data is transmitted, immediately after a change in a transmission rate; and
  limiting data size of data to be transmitted to at most a prescribed value and requesting transmission acknowledgement, during a period until the number of times that the data is transmitted reaches a prescribed number of times,
  wherein the data to be transmitted is assembled into a frame for transmission, and
  during the period until the number of times that the frame is transmitted reaches the prescribed number of times, a data generation section generating the data to be transmitted is instructed to limit the data size of the data to be transmitted to at most the prescribed value,
  the method further comprising permitting data of a data size greater than the prescribed value to be generated after the number of times that the frame is transmitted reaches the prescribed number of times.

18. The method according to claim 17, wherein one of the frames is transmitted during every transmission without being aggregated.

19. The method according to claim 17, wherein the frame is the MAC protocol data unit.

20. The method according to claim 17, wherein the transmission rate is determined using a packet error rate as an index.

* * * * *